United States Patent [19]

Robinson

[11] 4,198,384
[45] Apr. 15, 1980

[54] MULTISTAGE INCINERATION OF HALOGENATED HYDROCARBON CONTAINING WASTE STREAMS

[75] Inventor: Sam P. Robinson, Houston, Tex.

[73] Assignee: James G. Brown & Associates, Inc., Houston, Tex.

[21] Appl. No.: 850,641

[22] Filed: Nov. 11, 1977

Related U.S. Application Data

[63] Continuation of Ser. No. 644,553, Dec. 29, 1975, abandoned.

[51] Int. Cl.² .......................... C01B 7/18; C01B 7/00; C01B 7/22
[52] U.S. Cl. ................................ 423/488; 423/481; 423/483; 423/240
[58] Field of Search ............ 423/240 R, 240 S, 245 R, 423/245 S, 481, 488, 659, 483

[56] References Cited

U.S. PATENT DOCUMENTS

| 3,873,671 | 3/1975 | Reed et al. | 423/245 R |
| 4,018,879 | 4/1977 | Winnen | 423/240 R |

FOREIGN PATENT DOCUMENTS 2344217  3/1975  Fed. Rep. of Germany ...... 423/240 R

*Primary Examiner*—O. R. Vertiz
*Assistant Examiner*—Gary P. Straub
*Attorney, Agent, or Firm*—Arthur M. Dula; Ned L. Conley; David Alan Rose

[57] ABSTRACT

A method and apparatus for disposing of waste material by means of a multi-stage reaction favoring desired reaction products. The rate at which different reactions reach equilibrium at different temperatures and the effects of reaction stoichiometry are controlled by the process to promote desired reactions and discriminate against undesired ones. In the preferred embodiment, the present invention is a method of incinerating chlorinated hydrocarbons comprising reacting the chlorinated hydrocarbon at high temperature with less than a stoichiometric amount of oxygen for a period of time minimizing generation of nitrogen oxides;

quenching the reacting chlorinated hydrocarbon-air mixture with water, whereby phosgene generated in the first part of the reaction is hydrolized, free chlorine is minimized and the temperature of the reacting chlorinated hydrocarbon-air mixture is reduced to a lower temperature to minimize generation of nitrogen oxides;

further reacting the chlorinated hydrocarbon-air-steam reaction mixture at said lower temperature for a period of time not long enough to allow the formation of a significant amount of nitrogen oxides;

adding additional air to the reacting chlorinated hydrocarbon-air-steam mixture to further reduce the temperature of said reacting mixture and to provide a stoichiometric excess of oxygen and lower the reaction temperature;

further reacting said chlorinated hydrocarbon-air-water mixture with said stoichiometric excess of oxygen at said still lower temperature for a period of time long enough to fully react said chlorinated hydrocarbon to HCl, $CO_2$ and $H_2O$, but still sufficiently short to prevent formation of a significant amount of nitrogen oxides;

heating water and generating steam from indirect heat exchange with the effluent gas stream; and scrubbing hydrogen chloride gas out of said effluent gas stream.

Apparatus is provided to permit this stage-wise reaction and to control the addition of quench water and air, as well as the addition of any additional hydrocarbon fuel, as needed, to insure minimum generation of nascent oxygen and chlorine and nitrogen oxides while insuring substantially all the chlorine in the combustion gas stream is converted into hydrogen chloride.

10 Claims, 4 Drawing Figures

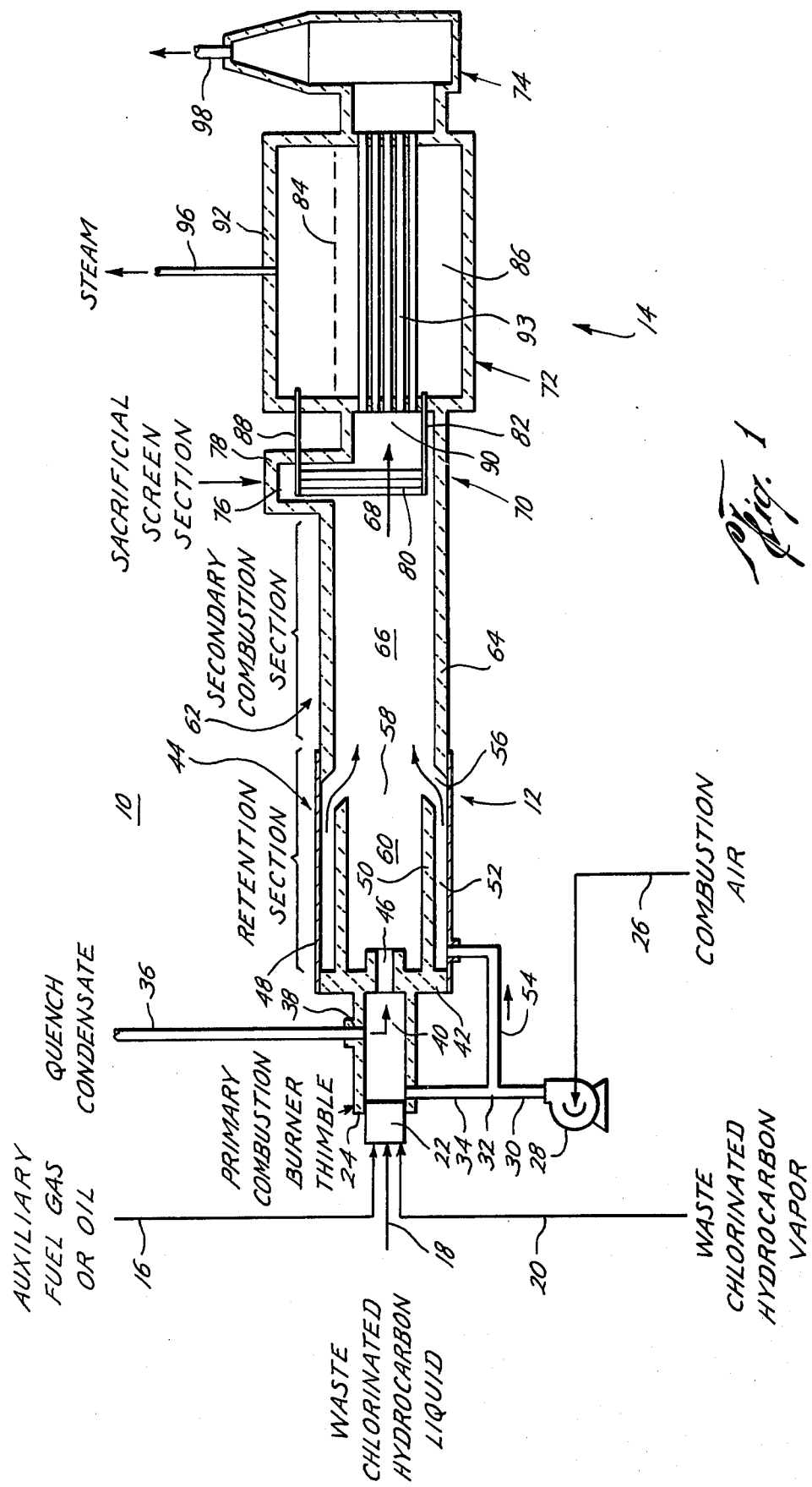

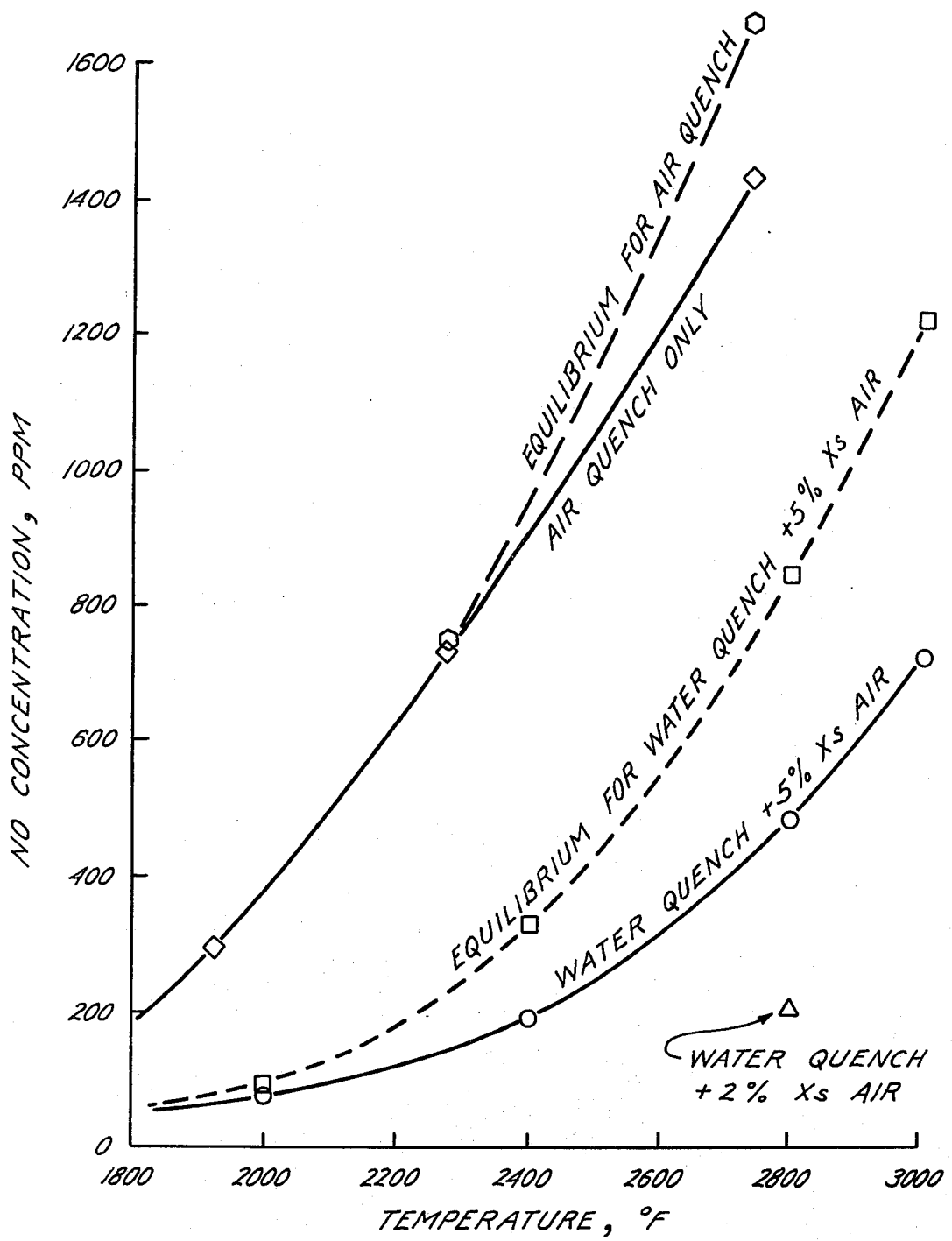

MULTISTAGE INCINERATION OF HALOGENATED HYDROCARBON CONTAINING WASTE STREAMS

This is a continuation of application Ser. No. 644,553, filed on Dec. 29, 1975, now abandoned.

BACKGROUND OF THE PRESENT INVENTION

1. Field of the Invention

The present invention generally relates to methods and apparatus for incinerating waste materials and more specifically relates to methods and apparatus used to incinerate chlorinated hydrocarbons to produce hydrogen chloride gas while minimizing the formation of nascent chlorine and oxygen and nitrogen oxides by manipulation of reaction equilibria and kinetics.

2. Background of the Prior Art

It has long been known that chlorinated hydrocarbons could be burned at controlled temperatures with excess air to produce hydrogen chloride, which is then removed by scrubbing. The prior art teaches the reaction of chlorinated hydrocarbons with an excess of air so the stoichiochemical excess of oxygen would temper the reaction temperature and maintain it in the range of 1800° to 2200° Fahrenheit. This process converts the majority of the chlorinated hydrocarbon to carbon dioxide, hydrogen chloride gas and water vapor, but also produces a significant amount of nitrogen oxides, phosgene and free chlorine.

In the past, presence of these contaminants has not been of concern to incinerator operators. Presently, however, strict federal guidelines have been and are being established regulating new incinerator facilities to prevent the release of contaminant effluents to the atmosphere. Because only hydrogen chloride is effectively removed by conventional scrubbing, it has become necessary to develop a system by which chlorinated hydrocarbons may be broken down without the generation of other contaminant by-products.

It has also long been recognized that it is possible to recover energy in the form of steam during the incineration of wastes by indirect heat exchange with hot reacting gases thereby increasing the efficiency, and, hence, the economic desirability of an incinerator. The prior art, however, does not teach the recovery of this heat energy from the hot reactant product gases of a chlorinated hydrocarbon incinerator. It was widely recognized that such recovery was desirable, but operation of prior art incinerators necessarily generated free chlorine and possibly nascent chlorine and oxygen, all of which are extremely reactive, and rapidly corrode steam boiler tubes. The short service life of steam boiler tubes in prior art incinerators made it economically unfeasible to recover thermal energy from their effluent gas streams.

The prior art also recognized that cooling water can be used to control the temperature of a reaction so as to minimize the formation of nitrogen oxides. (See U.S. Pat. No. 3,748,080)

It has further been recognized in the prior art that oxides of nitrogen may be controlled by means of a two stage combustion process wherein a first combustion stage is run with a stoichiochemical scarcity of oxygen followed by a second stage of combustion run with a stoichiochemical excess of oxygen to insure complete oxidation of the hydrocarbon fuel. This two stage combustion process effectively shifts the reaction temperature away from the maximum temperature with excess air to a lower temperature that does not favor the production of nitrogen oxides. (See U.S. Pat. No. 3,729,285)

The high temperatures used to most effectively destroy the carbon-halogen bond in chlorinated hydrocarbons, favors the production of nitrogen oxides that cannot be effectively scrubbed from incinerator flue gas.

The prior art does not teach the use of differential reaction equilibria and kinetics comprising controlled reaction stoichiometry in conjunction with a series of staged temperature reaction intervals designed to preferentially promote desired reactions while selectively retarding undesired ones.

SUMMARY OF THE PRESENT INVENTION

The present invention provides a method of converting gaseous, liquid, or solid waste products, such as, for example, chlorinated hydrocarbons, to harmless or easily controlled effluents, such as, for example, $CO_2$, $H_2O$ and HCl.

The present invention functions by controlling the reaction equilibria and kinetics of a multi-stage burning process to insure minimal generation of, for example, nascent chlorine and oxygen, free chlorine, and oxides of nitrogen. Time, temperature and stoichiometry are controlled to convert virtually, for example, all the chlorine in a chlorinated hydrocarbon to HCl, which may be economically scrubbed out of the effluent gas stream thus minimizing the release of undesired components to the atmosphere. The suppression of extremely corrosive components in the effluent stream also allows economical energy recovery by means of a waste heat boiler.

Specifically, combustion of the chlorinated hydrocarbon is performed at a high temperature such as, for example, 3,000° Fahrenheit, in a burner thimble for a short period of time, such as, for example, 0.1 seconds with less than or about a stoichiometric equivalent of oxygen. This fast burning prepared the residual chlorinated hydrocarbon for further combustion at a lower temperature. After the primary combustion, the hot reacting mixture is cooled to a temperature, such as, for example, 2400° Fahrenheit by a quench spray of, for example, water droplets while still at less than or about a stoichiometric equivalent of oxygen.

After the water quench, the hot reacting gas mixture is retained and allowed to react for a longer period such as, for example, 0.25 seconds, at the lower temperature while still at less than or about a stoichiochemical equivalent of air. At this lower temperature the longer combustion time does not produce a significant amount of nitrogen oxides and the excess of $H_2O$ introduced by the water quench combined with the deficiency in oxygen causes virtually all the chlorine of the chlorinated hydrocarbon to be converted to hydrogen chloride gas, which may then be easily scrubbed.

After the retention stage, a stoichiometric excess of air is introduced into the reacting gas mixture, further cooling the reacting gas mixture to a temperature such as, for example, 2200° Fahrenheit while introducing a stoichiometric excess of air to the reacting mixture. The final combustion takes place after the introduction of this secondary air quench and lasts, for example, approximately 0.35 seconds. During this period the remainder of the unreacted chlorinated hydrocarbon in the effluent gas stream is converted to HCl, $CO_2$ and $H_2O$. The reaction, at this still lower temperature, does not permit the generation of a significant quantity of nitrogen oxides and the resultant effluent gas stream is essentially composed of $H_2O$, $CO_2$, and hydrogen chloride gas.

It is a primary object of the present invention to precisely control the stoichiochemical ratio of reaction components in a multi-stage combustion process, the temperature of the different stages of these reactions and the duration of each reaction stage at each temperature to maximize the production of desired components of the effluent gas stream while minimizing undesired components.

In the above example during the primary fast, hot burn, the reaction temperature is favorable for the production of nitrogen oxides, but the production of nitrogen oxide is highly time dependent, and in the present invention, this reaction temperature is not maintained long enough for nitrogen oxide equilibrium to be reached. The primary burning also occurs in the absence of a stoichiometric excess of oxygen, and is followed immediately by an $H_2O$ quench. This lack of oxygen and abundance of water shifts the equilibrium of the reactions that otherwise would produce nascent chlorine and free chlorine to greatly favor the production of hydrogen chloride gas. Combustion is retained at this lower temperature with a lack of oxygen and excess of water to insure the hydrogen chloride forming reactions reach substantial equilibrium, thus maximizing the production of hydrogen chloride. Finally, the addition of a stoichiometric excess of air to the reacting mixture allows the residual chlorinated hydrocarbon to be fully converted to carbon dioxide, hydrogen chloride and water vapor at said still lower temperature.

The hot effluent gas stream resulting from the process of the present invention contains a far lower concentration of free chlorine and its reaction products, nascent chlorine and nascent oxygen than effluent gas streams from processes taught by the prior art. This makes it economically possible to recover heat from the present invention's hot effluent stream by using, for example, a waste heat boiler. In the present invention waste heat recovery may be enhanced by placing a sacrificial thermosyphon screen tube section ahead of a conventional waste heat boiler. The thermosyphon screen lowers the temperature of the effluent gas such as, for example, lowering it by between 75° and 250° Fahrenheit, permitting the waste heat boiler to generate medium pressure steam, such as, for example, steam at 225 p.s.i. or high pressure hot water. The effluent gas stream from the waste heat boiler may then be processed through a conventional HCl scrubber to remove HCl and the resultant carbon dioxide and water vapor may be released into the atmosphere.

It is an object of the present invention to provide a means of burning a solid, liquid or gaseous waste material in a process that controls stoichiochemistry, burning time, and burning temperature in a multi-stage combustion process to maximize desired nonpolluting effluents or effluents that are easily scrubbed out of an effluent gas stream while minimizing the production of undesirable or difficult to remove contaminants.

It is a further object of the present invention to control the reaction kinetics of a multi-stage combustion process to yield a desired effluent combustion.

Yet a further purpose of the present invention is to produce an effluent gas stream from the combustion of contaminated hydrocarbon that is relatively free of corrosive components.

Yet still another purpose of the present invention is to provide for an equilibrially and kinetically controlled multi-stage reaction process producing a hot and relatively non-corrosive gas stream and recovering energy in form of steam from a waste heat boiler from that gas stream.

It should be noted that the present invention broadly comprises controlling the stoichiochemistry and burning temperature of a multi-stage combustion process wherein the reaction time of the various stages of combustion is modulated to discriminate against undesired reactions.

BRIEF DESCRIPTION OF THE DRAWINGS

For a further understanding of the nature and objects of the present invention, reference should be had to the following detailed description, taken in conjunction with the accompanying drawings, wherein FIG. 1 is a schematic flow sheet of the apparatus of a chlorinated hydrocarbon waste incinerator capable of practicing and constructed according to a preferred embodiment of the present invention;

FIG. 3 is a graph showing the effect of air and water quench on the concentration of nitrogen oxide at temperatures within the operating range of a preferred embodiment of the present invention.

DESCRIPTION OF THE PREFERRED EMBODIMENT

Figure 4:
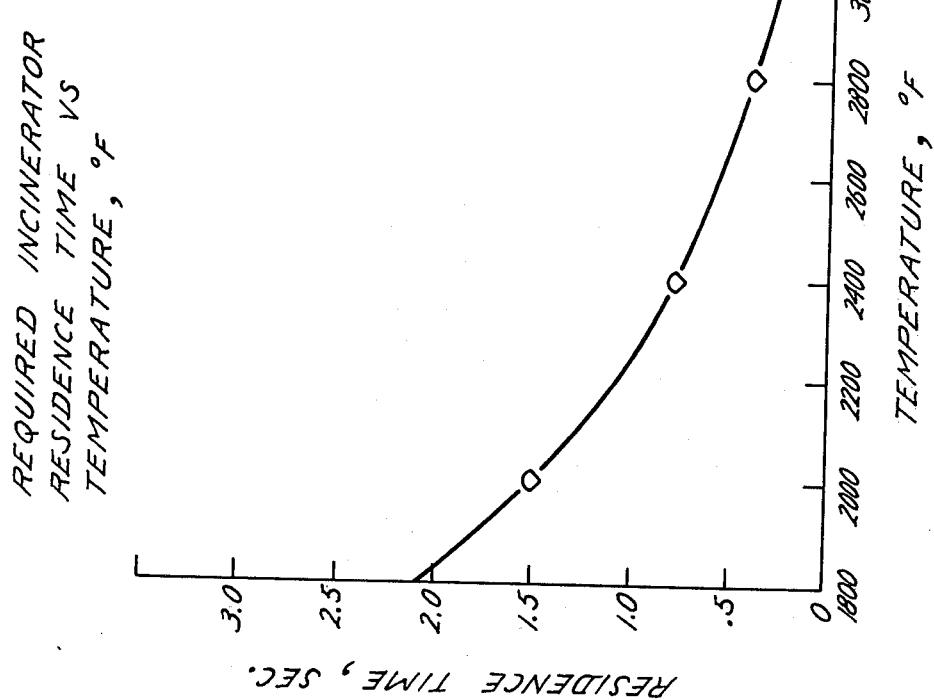
FIG. 4 is a graph showing the required incinerator residence time for temperatures within the operating range of the preferred embodiment of the present invention.

In FIG. 1, there is shown an incinerator 10—structure—divided into a multi-stage combustion section 12 and a waste heat recovery section 14 for the receiving of chlorinated hydrocarbon wastes 18, 20 for conversion to HCl and gases suitable for scrubber feed at outlet 98.

Auxiliary hydrocarbon fuel line 16, waste chlorinated hydrocarbon liquid line 18 and gaseous waste chlorinated hydrocarbon line 20 all feed into input mixer 22 of thimble burner 24. Flow controlled combustion air 26 is also introduced into thimble burner 24. It is fed by blower 28 through input line 30 to T-joint 32. From T-joint 32, primary air line 34 which is controlled by a valve, orifice or other suitable structure not shown feeds primary combustion air to thimble burner 24. Quench condensate line 36 located at the exit end 40 of thimble burner 24 feeds a fine spray of water through inlet 38 to exit end 40 which is controlled by a valve, orifice or other suitable structure not shown.

The exit end 40 of thimble burner 24 is affixed by welding or other suitable connection to and in flow communication with the input end 42 of retention section 44 through passage 46. Retention section 44 includes an outer wall 48 and an inner wall 50 forming an annular air passage 52 and retention chamber 60. Wall 50 is of suitable material to permit heat exchange from retention section 60 to annular air passage 52. Secondary air line 54 from T-joint 32 feeds air which is controlled by a valve, orifice or other suitable structure not shown to annular air passage 52. Annular air passage 52 terminates at the entrance 56 communicating annular passage 52 with end 58 of retention chamber 60.

Secondary combustion section 62 is connected by welding or other suitable connection at its inlet end to and in flow communication with the end 58 of retention chamber 60. Secondary combustion section 62 also includes insulating wall 64 surrounding a combustion chamber 66 and an outlet end 68 of secondary combustion chamber 66.

Waste heat recovery section 14 includes an inlet chamber 76 having sacrificial thermosyphon screen tube section 70. Waste heat recovery section 14 also includes waste heat boiler 72 in flow communication with the connected by welding, brick or other suitable means to outlet end 68 of secondary combustion section boiler 72 and transition section 74.

Chamber 76 is lined with an insulating wall 78 and contains sacrificial thermosyphon screen tubes 80. These tubes are in fluid tight flow communication at their lower end by conduit 82 with boiler chamber 86 below water level 84. The top of said tubes are in fluid tight flow communication through a conduit 88 to the chamber 86 at a point above water level 84. Outlet 90 of sacrificial tube section 70 connects in fluid tight flow communication by molding, welding or other suitable means to fire tubes 93. Fire tubes 93 pass through chamber 86 of boiler 72 and are in fluid tight flow communication by welding or other suitable connection at their outlet to transition section 74.

Boiler 72 includes a water inlet and control valves, not shown, to maintain water to level 84 above fire tubes 93, a steam exit line 96 mounted by welding or other suitable process in wall 92 above the water level 84 and may include means for making pressure, temperature, flow and level measurements.

Transition section 74 comprises a means of communicating the effluent from fire tube section 93 to a conventional HCl scrubber, which is well-known in the art, through output line 98.

The construction of incinerators and waste heat recovery units is well-known to those skilled in the art. Thus construction details of the preferred embodiment may be altered without departing from the scope of the present invention.

The preferred embodiment of the present invention uses carbon steel or low alloy chromemoly tubes that are approximately 10 gauge wall thickness for the fire tubes. Also, in the preferred embodiment of the present invention, a double-walled incinerator design is used with part of the combustion air sweeping any hydrogen chloride or water vapor leakage from the refractory insulating material and diluting such leakage. This also preheats the secondary combustion air. In the preferred embodiment of the present invention the sacrificial screen tubes comprise 3 to 6 rows in delta configuration. The incinerator and waste heat boiler may be made of any materials suitable for containing their respective reactions that meet the safety standards presently promulgated by the government.

Process Chemistry

Functionally chlorinated hydrocarbons undergo the following reactions during their combustion $$\text{Chlorinated hydrocarbon} + O_2 = HCl + H_2O + CO_2 \qquad 1.$$

$$4CHl + O_2 = 2Cl_2 = 2H_2O \qquad 2.$$

$$4HCl + O_2 = 2Cl + Cl_2 + H_2O \qquad 3.$$

$$Cl_2 + H_2O = HCl + HClO = 2HCl + O^- \qquad 4.$$

$$N_2 + XO_2 = 2NO_x \qquad 5.$$

$$COCl_2 + H_2O = CO_2 + CHl \qquad 6.$$

Primary Reaction

Equation 1 shows the primary reaction by which a chlorinated hydrocarbon reacts with oxygen to form hydrogen chloride, carbon dioxide and water vapor.

Secondary Reactions

Equation 2 shows the secondary reaction by which free chlorine can be produced from hydrogen chloride. It is undesirable to generate free chlorine in the present invention because it is corrosive and is not removed from the effluent gas stream by water scrubbing.

Equation 3 shows the secondary reaction by which nascent chlorine is generated within a combustion chamber. Nascent chlorine is undesirable because it is extremely corrosive.

Equation 4 shows the primary mechanism by which free chlorine and water vapor may combine to produce hydrogen chloride and nascent oxygen. Nascent oxygen is undesirable because it is highly corrosive.

Equation 5 shows the secondary reaction by which nitrogen in the air combines with oxygen at high temperatures to produce nitrogen oxides. There are a variety of nitrogen oxides produced by this reaction, but most are unstable. Nitric oxide (NO) and nitrous oxide ($N_2O$) predominate. The generation of nitrogen oxides is very temperature and time dependent. High temperatures favor the formation of nitrogen oxides in the combustion process, but a relatively long period of time at high temperature is required to achieve equilibrium in this reaction. At lower temperatures, longer and longer periods of time are required for the reaction to come to equilibrium. Thus a substantial amount of nitrogen oxides cannot be produced instantaneously even at very high temperatures. Nitrogen oxides are extremely undesirable because of federal regulations prohibiting their atmospheric discharge.

The final equation, 6, shows the secondary reaction by which phosgene (carbonyl chloride) is produced from carbon dioxide and hydrogen chloride gas. Phosgene is a lung irritant used in gas warfare, and is highly poisonous. Thus its production is obviously undesirable.

To understand the way the present invention works, it is important to remember that when a change is made in a variable that determines the state of a set of chemical reactions at equilibrium, the equilibrium states will readjust in a manner so as to compensate the change in the variable under consideration. This principle is sometimes stated: When a stress is applied to a system at equilibrium the position of equilibrium will shift in a direction to counteract or undo the stress. In the present invention for example, in equation 1, if the reaction shown proceeds with a deficiency of oxygen and an abundance of water vapor, as in the preferred embodiment of the present invention, then the equilibrium of the reacting system will shift to favor the production of hydrogen chloride.

It should be noted at the beginning of the discussion of the process of the present invention that both equations 2 and 3 shown above, i.e. those controlling production of hydrogen chloride and the generation of nascent chlorine are shifted to favor the production of hydrogen chloride by an abundance of H₂O vapor and a scarcity of oxygen.

The Process

The preferred embodiment of the present invention operates as follows:

Chlorinated hydrocarbons are injected as solids, liquids or gases, through lines 18 or 20 respectively, into the input area 22 of a thimble burner 24. If the chlorinated hydrocarbon is highly unsaturated, it may be necessary to add additional hydrogen by injecting auxiliary hydrocarbon fuel through line 16 into the thimble burner. An amount of air controlled to be less than or about the stoichiochemical equivalent of the chlorinated hydrocarbon and fuel introduced is also injected through line 34 into the thimble burner. Within the thimble burner, waste chlorinated hydrocarbon begins to react with the oxygen in the air. This reaction converts most of the chlorinate hydrocarbon into hydrogen chloride, carbon dioxide and water vapor. The reaction within the thimble burner is carried out at a high temperature, such as, for example, 3000° Fahrenheit. This high temperature insures the complete vaporization of all the chlorinated hydrocarbon allowing combustion to be completed at a lower temperature later in the incineration process. Primary combustion within the thimble burner is limited by flow rate and thimble volume to last for a short period of time, such as, for example, 0.1 second plus or minus 0.05 seconds. During this short period of time, the reactions that produce nitrogen oxides do not have time to reach equilibrium and no significant amounts of oxides of nitrogen are formed. At the end of the short period of time, substantially no free chlorine, nascent chlorine or nascent oxygen are present in the hot reacting gas mixture.

At this point, water is sprayed through line 36 in opening 38 in thimble burner 24 discharge to combine with the reacting gas mixture. The amount of water injected into the 3000° Fahrenheit mixture is carefully controlled to reduce the temperature of the reacting mixture to a lower temperature such as, for example, 2400° Fahrenheit plus or minus 50° Fahrenheit. At this temperature the water laden, oxygen deficient, reacting mixture enters combustion chamber 60 of retention section 44. By LeChatelier's principle the excess of water vapor and deficiency of oxygen force equilibrium reactions that could form nascent and free chlorine to form hydrogen chloride gas. It is possible, because carbon dioxide and hydrogen chloride are present, that phosgene may form in the thimble burner. If this happens, the water quench that controls the temperature of combustion gases in the retention section and minimizes formation of free chlorine also hydrolizes any phosgene present in the combustion gas stream to form carbon dioxide and hydrogen chloride.

The water quench effluent is introduced to retention chamber 44. Retention chamber 44 is of sufficient volume to permit the reaction to continue at the lower temperature for a longer period of time such as, for example, 0.25 seconds plus or minus 0.05 seconds. During this length of time, the reactions shown in equations 2 and 3 above (controlling the decomposition of hydrogen chloride gas) have time to reach equilibrium favoring the production of HCl while reaction number 5 (governing the generation of nitrogen oxide), because of the lack of oxygen, short reaction time and lower temperature, does not reach equilibrium favoring the production of oxides of nitrogen. Thus the chlorine in the chlorinated hydrocarbon is converted to hydrogen chloride, which may easily be scrubbed from the effluent gas stream.

At the end of this retention stage, a stoichiometric excess of air injected through secondary air line 54 and annular air passage 52 through openings 56 is introduced to the effluent from the retention stage at the inlet 58 of secondary combustion section 62 which is also the outlet 58 of the retention chamber 60. The flow of secondary air is controlled to reduce the temperature of the gas stream still further such as, for example, to between 2000° and 2200° Fahrenheit. The volume of secondary combustion section 62 and the flow rate is such that the gaseous reacting mixture is held at this temperature for a still longer period of time such as, for example, 0.35 seconds plus or minus 0.05 seconds to allow the unreacted portion of the chlorinated hydrocarbons and hydrocarbons in the combusting mixture to fully convert to HCl, carbon dioxide and water vapor.

After remaining in the secondary combustion section for the still longer period of time, the hot effluent gas enters a waste heat recovery section 14. The hot gas first impinges on a sacrificial fire screen tube section 70 containing tubes 80 that act as a thermosyphon to pump water from below the water level 84 of the waste heat boiler 72 to above the water level 84 in order to produce steam, thus allowing for more efficient recovery of energy from the system and a permanent installation of boiler 72. This sacrificial tube section also screens the fire tubes of the waste heat boiler from the flame radiation of the combustion process. The thermosyphon screen tubes are much easier to replace than the fire tubes of the boiler should leakage occur as a result of any remaining corrosive gases or flame radiation exposure. Alternatively, the fire tubes of the boiler may be offset from the combustion sections of the incinerator without departing from the present invention. The hot effluent gases are reduced in temperature such as, for example, reduced between 75° and 150° Fahrenheit in passage through the screen tube section 70.

The gases then enter the fire tubes 93 in the waste heat boiler 72 and produce steam at approximately 250 psia.

The exhaust gas stream is prevented from entering annular air jacket 52 by the constant flow of air sweeping through the annular jacket.

If the temperature of the combustion gas stream falls below the hydrogen chloride dew point, hydrochloric acid will be formed. To avoid this result during start up of the process, the combustion section may be brought up to operating temperature entirely on hydrocarbon fuel not containing chlorine. Prior to shut down, the waste chlorinated hydrocarbon feed should be stopped and the combustion section run on auxilliary hydrocarbon fuel to cleanse the system of chlorine and hydrogen chloride.

Once the waste heat has been recovered, the effluent gas stream passes into a transition section 74. From transtion section 74, the combustion gas stream passes out line 98 to a hydrogen chloride scrubber, as is well-known in the art, which removes the hydrogen chloride gas. The CO₂ and H₂O may then be released to the atmosphere.

EXAMPLE

Referring once again to FIG. 1, a 45,000,000 btu per hour incinerator designed to dispose of gaseous chlorinated hydrocarbon is given as an example of the present invention. This system is capable of handling liquid chlorinated hydrocarbons and hydrocarbons, if their disposal is desired.

When operating according to the preferred embodiment of the present invention, waste gas comprising 3.09 pound moles per hour of ethyl chloride, 0.03 moles per hour of acetylene, 15.45 moles per hour of ethylene, 22.95 moles per hour of ethane, 1.19 moles per hour of ethylene oxide, 6.76 moles per hour of normal butane, 12.35 moles per hour of oxygen, 62.43 moles per hour of nitrogen and 24.47 moles per hour of carbon dioxide are injected through line 20 into primary combustion thimble burner 24. Air sufficient to provide 250.2 moles per hour of oxygen, 954.09 moles per hour of nitrogen and 42.76 moles per hour of water vapor is injected into the thimble burner through primary air input line 34. Completing the primary combustion mixture, 38.27 moles per hour of natural gas (primarily methane) is injected through line 16 into the thimble burner. Within the thimble burner, the gases react at a temperature of approximately 3000° for 0.1 plus or minus 0.05 seconds at 0.43 psig.

300.19 moles per hour of quench water (5409 pounds per hour) at 80° Fahrenheit and 25 psig is injected through line 36 into the thimble burner. This quench water combustion gas stream enters chamber 60 through port 46 at a temperature of 2400° Fahrenheit plus or minus 50° Fahrenheit and reacts at 0.25 psig for a period of 0.25 plus or minus 0.05 seconds.

At the end of this period the reacting combustion gas stream is mixed with sufficient secondary air from annular air jacket 52 to provide 103.62 moles per hour of oxygen, 319.76 moles per hour of nitrogen and 17.70 moles per hour of water to the combustion gas mixture. This addition of air, although the air had been slightly preheated by its passage through annular air jacket 52, lowers the temperature of the combustion gas stream to 2000° Fahrenheit plus or minus 50° Fahrenheit. The combustion gas stream reacts with this secondary air at 0.25 psig for a period of 0.35 plus or minus 0.05 seconds.

The combustion gas stream impinging upon sacrificial thermosyphon screen section 70 contains 115.66 moles per hour of oxygen, 1408.32 moles per hour of nitrogen, 170.77 moles per hour of carbon dioxide, 3.09 moles per hour of hydrogen chloride and 575.19 moles per hour of H₂O at 2000° Fahrenheit and 0.17 psig. The thermosyphon screen tubes section reduces the temperature of the combustion gas stream by 75° to 150°. The combustion gas stream then enters the boiler 14.

Boiler 14 extracts energy by indirect heat exchange with the combustion gas stream to make 28,510 pounds per hour of 70 psig steam at 316° Fahrenheit. The boiler requires 30,650 pounds per hour of boiler feed water make up at 220° Fahrenheit. The combustion gas stream then enters the transition section at 0 psig at 450° Fahrenheit. At this time the make up of the combustion gas stream is exactly the same as it was upon entering the boiler section.

Conventional HCl scrubbing (not shown on FIG. 1) removes 3.09 moles per hour of weak hydrochloric acid and lowers the temperature of the combustion gas stream to 158° Fahrenheit.

In the example, the effluent that passes to the atmosphere through a stack (not shown on FIG. 1) comprises 115.66 moles per hour of oxygen, 1408.32 moles per hour of nitrogen, 170.77 moles per hour of carbon dioxide, and 749.17 moles per hour of water vapor. The effluent gas stream passed to the atmosphere contains less than 100 parts per million-by volume, of nitrogen oxide and less than 6 parts per million of free chlorine.

Figure 2:
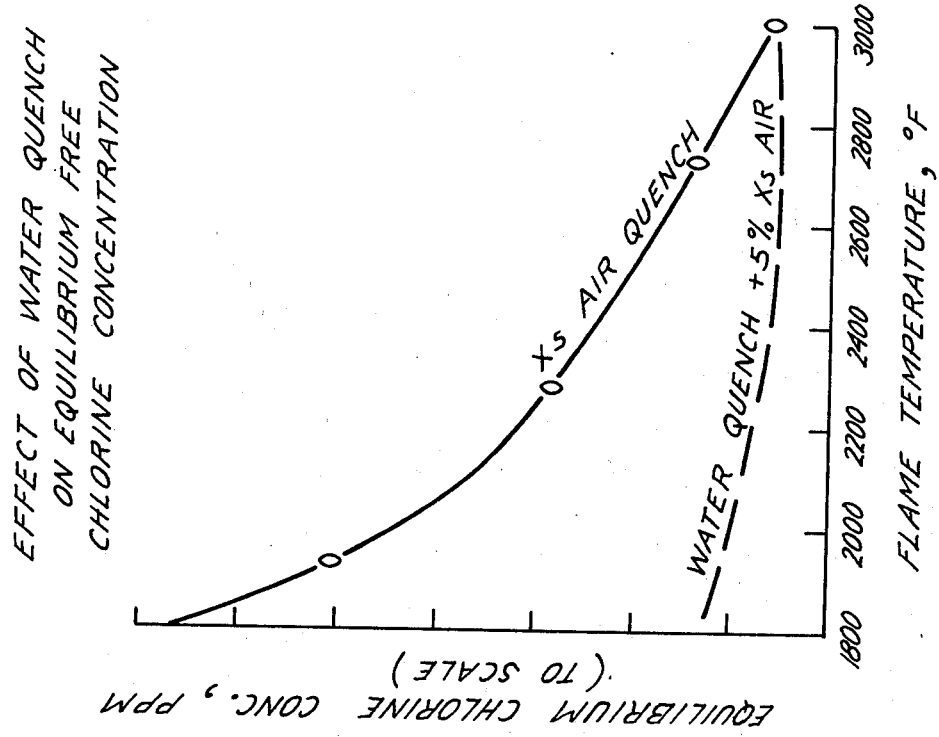
FIG. 2 is a graph showing the effect of air and water quench on the equilibrium concentration of free chlorine at different temperatures within the operating range of the preferred embodiment of the present invention.

Referring now to FIG. 2, which shows the relative effects of air and water quench on equilibrium free chlorine concentration at various temperatures, it will readily be appreciated that the present invention's use of a water quench to drop the temperature of the combustion gas stream from 3000° to 2400° Fahrenheit generates less than $\frac{1}{4}$ the amount of free chlorine that would be generated if the same temperature reduction was achieved by means of an air quench.

Referring now to FIG. 3, which shows the nitrogen oxide concentration from the incinerator stack gas as a function of temperature for air and water quench, it will readily be appreciated that use of a water quench to reduce the temperature of the combustion gas stream from 3000° to 2400° Fahrenheit results in the generation of less than $\frac{1}{4}$ of the amount of nitrogen oxide that would be generated if an air quench was used to achieve this same measure of cooling.

Referring now to FIG. 4, which shows the required incinerator residency time for the preferred embodiment of the present invention plotted against temperature, it will be at once apparent that the specific operating temperature within the general ranges given in the specifications are largely a matter of design choice and that the present invention may be operated from a primary combustion temperature of 3000° Fahrenheit to a secondary combustion temperature of 1800° Fahrenheit while maintaining an acceptable residency time of under 2½ seconds.

GENERAL EXAMPLE

The above example was a specific example showing one operational embodiment of the present invention, a more general example would be as follows: a mixture of chlorinated hydrocarbon and from 85% to 105% of a stoichiometric amount of air is reacted for an initial period of between 0.05 and 0.15 seconds at a temperature of between 2800° Fahrenheit and 3200° Fahrenheit. Sufficient water is then added to the reacting mixture to lower the mixture's temperature to between 2300° Fahrenheit and 2600° Fahrenheit and the mixture is held at this temperature for between 0.15 and 0.35 seconds. Additional air is then added to the mixture until the mixture reaches a temperature of between 1800° Fahrenheit and 2300° Fahrenheit. The mixture is then held at this temperature for between 0.25 and 0.5 seconds. Since, as was shown above, this reaction process is a stream oriented process, the last period of reaction will coincide with the gases entering a heat recovery and/or hydrogen chloride scrubber section of the device described above. The addition of cooling air to reduce the temperature of the reacting mixture to between 1800° Fahrenheit and 2300° Fahrenheit causes the mixture to have a 10% to 60% stoichiometric excess of air by the time it reaches the prescribed temperature range.

SPECIFIC EXAMPLE

Specifically the initial reaction may preferably be at between 2900° F. and 3100° F. for between 0.08 and 0.12 seconds. The second reaction period may preferably be between 0.2 and 0.3 seconds at between 2350° F. and 2450° F. The final reaction may preferably be at between 2150° F. and 2250° F. for between 0.3 and 0.4 seconds.

The present invention is a multi-stage combustion process that controls the chemical make-up, temperature and time of the various stages of combustion of a waste product to maximize desired effluents and minimize undesired effluents and effluents that are not easily scrubbed out of the waste gas stream. By controlling the time of combustion as well as its stoichiometry and temperature, the present invention is able, in its preferred embodiment, to break down chlorinated hydrocarbon without producing undesirable levels or chlorine, nascent chlorine or oxygen, or oxides of nitrogen and allows the economical recovery of waste heat through a conventional waste heat boiler.

It should be understood that the concept of the present invention is a broad one and is not limited merely to the destruction of chlorinated hydrocarbon but may be used in any multi-stage incineration process where it is possible to minimize an undesirable effluent by means of manipulating reaction times, stoichiometry, and temperature.

Although the system described in detail supra has been found to be most satisfactory and preferred, many variations in structure and method are possible. For example, it is anticipated that the present invention will have wide applicability for the incineration of a great variety of organic and inorganic products, for example the destruction of other halogenated hydrocarbons, as well as chelated inorganic compounds and other materials. Also, sacrificial screen tube sections need not be used. Moreover a waste heat boiler section need not be used. Additionally, any suitable materials of manufacture may be used. Also the quench may be by steam.

The above are merely exemplary of the possible changes or variations.

Because many varying and different embodiments may be made within the scope of the inventive concept herein taught and because many modifications may be made in the embodiment herein detailed in accordance with the descriptive requirements of the law, it should be understood that the details herein are to be interpreted as illustrative and not in a limiting sense.

What is claimed as invention is:

1. A method of incinerating halogenated hydrocarbon containing waste streams comprising:
   A. reacting the halogenated hydrocarbon containing waste streams with from 85% to 105% of the stoichiometric amount of air required for complete combustion of said material at between 2800° F. and 3200° F. for an initial reaction period of between 0.01 seconds and 0.15 seconds to produce a first intermediate mixture;
   B. adding sufficient water to said first intermediate mixture to lower the reaction temperature to between 2300° F. and 2600° F.;
   C. reacting said first cooled intermediate mixture at between 2300° F. and 2600° F. for a second reaction period of between 0.15 and 0.35 seconds to produce a second intermediate mixture;
   D. adding sufficient air to said intermediate mixture to reduce its temperature to between 1800° F. and 2300° F.;
   E. reacting said cooled second intermediate mixture at between 1800° F. and 2300° F. for between 0.25 and 0.5 seconds with a 10% to 60% stoichiometric excess of air relative to the initial feed of said waste streams in step A required for complete combustion of said cooled second intermediate mixture to produce a final hydrogen halide containing product gas.

2. A method of incinerating halogenated hydrocarbon containing waste streams as in claim 1 including the addition in step A of sufficient non-halogenated hydrocarbons to hydrogenate the halogenated hydrocarbon containing waste streams.

3. A method of incinerating halogenated hydrocarbon containing waste streams as in claim 1 including the initial step of preheating the reactor by burning only a non-halogenated combustible material.

4. A method of incinerating halogenated hydrocarbon containing waste streams as in claim 1 wherein said incineration is terminated by stopping the feeding of said waste stream, and then burning a non-halogenated combustible material for a period of time sufficient to flush all halogen values from the reactor.

5. A method of incinerating halogenated hydrocarbon containing waste streams as in claim 1 including controlling at least one step of steps A through E of the reaction by varying at least one process variable, said variables including temperature and stoichiometry of the reaction in response to the values of monitored reaction variables in at least one step A through E of the reaction.

6. A method of incinerating halogenated hydrocarbon containing waste streams as in claim 1 wherein said initial reaction is conducted at between 2900° F. and 3100° F. for a period of between 0.08 and 0.12 seconds; said second reaction is conducted at between 2350° F. and 2450° F. for a period of between 0.2 and 0.3 seconds; and said final reaction is conducted at between 2150° F. and 2250° F. for a period of between 0.3 and 0.4 seconds.

7. A method of incinerating halogenated hydrocarbon containing waste stream as in claim 1 including scrubbing the hydrogen halide component from the final product gas of the final reaction.

8. A method of incinerating halogenated hydrocarbon containing waste streams as in claim 1 wherein the halogenated hydrocarbon is a chlorinated hydrocarbon.

9. A method of incinerating halogenated hydrocarbon containing waste streams as in claim 1 wherein the halogenated hydrocarbon is a fluorinated hydrocarbon.

10. A method of incinerating halogenated hydrocarbon containing waste stream as in claim 1 wherein step A reacts said halogenated hydrocarbon containing waste stream with from 85% to less than a stoichiometric amount of air.

* * * * *